United States Patent
Freeman et al.

(10) Patent No.: US 6,808,808 B2
(45) Date of Patent: Oct. 26, 2004

(54) COATING COMPOSITION CONTAINING SURFACE TREATED CLAY MIXTURE, THE SURFACE TREATED CLAY MIXTURE USED THEREFOR, AND METHODS OF THEIR USE

(76) Inventors: Gary M. Freeman, 200 Hilltop Cir., Macon, GA (US) 31210; William G. Setser, 3140 Ryecroft Rd., Birmingham, AL (US) 35223

( * ) Notice: Subject to any disclaimer, the term of this patent is extended or adjusted under 35 U.S.C. 154(b) by 0 days.

(21) Appl. No.: 10/341,509

(22) Filed: Jan. 14, 2003

(65) Prior Publication Data

US 2004/0138339 A1 Jul. 15, 2004

(51) Int. Cl.⁷ .................................................. B32B 19/00
(52) U.S. Cl. ...................... 428/405; 523/212; 523/213; 106/409; 106/487
(58) Field of Search ............................... 523/212, 213; 428/405; 106/409, 487

(56) References Cited

U.S. PATENT DOCUMENTS

| | | |
|---|---|---|
| 4,075,153 A | 2/1978 | Leo |
| 4,171,228 A | 10/1979 | Lowrey |
| RE30,450 E | 12/1980 | Iannicelli |
| RE30,699 E | 8/1981 | Iannicelli |
| 5,458,680 A * | 10/1995 | Shurling, Jr. et al. ........ 106/487 |
| 5,571,851 A * | 11/1996 | Freeman et al. ............ 523/212 |
| 5,840,795 A * | 11/1998 | Freeman et al. ............ 524/447 |
| 5,846,309 A | 12/1998 | Freeman et al. |
| 5,928,956 A | 7/1999 | Rotzsche et al. |
| 6,011,087 A | 1/2000 | Marshall et al. |
| 6,027,740 A * | 2/2000 | Puterka et al. .............. 424/405 |
| 6,197,105 B1 * | 3/2001 | Freeman et al. ............ 106/487 |
| 6,204,322 B1 | 3/2001 | Labauze |

* cited by examiner

Primary Examiner—Margaret G. Moore
(74) Attorney, Agent, or Firm—Carlos Nieves; William Parks

(57) ABSTRACT

A coating composition and a pigment comprising a surface-treated clay mixture used therein, and, optionally, microspheres, in which the coating composition comprises a curable or hardenable resin system into which is dispersed the pigment. High build, corrosion resistant coating compositions are provided having high pigment content, which translates into lower material costs, attributable at least in part to the particle packing benefits derived from the unique clay mixture used as a filler.

35 Claims, 3 Drawing Sheets

COATING COMPOSITION CONTAINING SURFACE TREATED CLAY MIXTURE, THE SURFACE TREATED CLAY MIXTURE USED THEREFOR, AND METHODS OF THEIR USE

BACKGROUND OF THE INVENTION

1. Field of the Invention

This invention relates to a coating composition containing a chemically surface treated clay mixture, and methods of its use as a protective coating. The invention also relates to the surface treated clay mixture itself and a pigment mixture combining it and microspheres.

2. Description of the Related Art

Protective surface coatings are used in a wide variety of applications to provide a thin film barrier between the surface of a body needing protection and its immediate surrounding environment. Protective coatings of this sort have been used, for instance, on marine, aircraft, and industrial structures and parts. These protective coatings often are formulated to include a curable organic medium, pigments, and inorganic filler particles dispersed within the medium.

It is well known that the proper selection of the pigments has a profound influence on protective and other functional properties of protective coatings. The amount of organic medium present between the pigment particles, and some important aspects of the behavior of the medium are determined by the number, size, degree of dispersion and surface characteristics of the pigment particles. The pigments, as differentiated from the fillers provide many of the essential properties of the coating such as color, corrosion protection, durability and special rheological properties that address the practical aspects of coating application such as ease of application and firm build. Many conventional fillers used in coatings are commodities having lower cost than the base resin of the coating. For this reason, fillers are often used to reduce the cost of the coating. The amount of cost reduction that can be achieved through the use of commodity fillers is limited since their use at moderate levels may cause reduction of gloss and increase of viscosity. Ultimately, attempts to reduce cost by merely increasing the proportion of filler in the coating have been hampered by the drawback that a composition is reached beyond which there is insufficient medium to satisfactorily coat the filler particles and fill the interstices between them. A further increase in the pigment volume concentration (PVC) results in a sharp decline in mechanical and protective properties as a function of increased film porosity.

U.S. Pat. No. 4,171,228 describes a pigment composition for high build protective coatings material using a combination of two groups of pigments each of nodular (isometric) geometry comprised of relatively fine particles used in conjunction with smooth larger pigments. The large nodular pigments are exemplified as low density hollow or cellular microspheres made of glass, ceramic or polymer. The paints incorporating the combination of nodular pigments as prescribed in the '228 patent are described as permitting an increase in the non-volatile content of the paints without viscosity increase. The '228 patent represents that nodular pigments particles are necessary to achieve lower viscosity at high pigment loading scenarios, and to minimize pigment particle interlock and flow impedance.

Efforts in the past have been made to improve the properties and usefulness of solid inorganic filler and pigment particles by chemical surface treatment of them with organosilanes. U.S. Reissue Pat. No. RE30,450 discloses a finely divided particulate inorganic pigment, such as kaolin clay or hydrated silica, which is surface modified with 1–3% amino organosilane by spray drying a pigment slurry in which the silane is dispersed. The '450 reissued patent discloses that the resulting modified pigment is useful as a component in thermosetting resins, such as polyurethanes, epoxy polymers, and others mentioned, as well being useful as a component in paper, paints, varnishes, inks, and paper coating compounds. U.S. Reissue Pat. No. RE30,699 discloses polyurethane polymer compositions which are filled with a kaolin clay modified with from 1–3% of an amino organosilane, which is formed by spray drying a pigment slurry in which the silane is dispersed.

U.S. Pat. No. 6,197,105 discloses sulfur- and vinyl-functional silane treated kaolin clays useful as pigments or extenders in rubber compositions, in which the chemically surface treated clays are obtained by predispersing or emulsifying the silane in water by means of a surfactant before mixing it with the clay particles.

U.S. Pat. No. 4,075,153 discloses use of aminosilane or mercaptosilane treated kaolin clay in a two-component chromate-containing primer system. The '153 patent more specifically describes the use of silane-treated clay in at least one of the two components of the primer system. The first component of the primer solution of the '153 patent includes a liquid solution of a resinous polyepoxide and the second component includes a liquid solution of an epoxy curing agent carrying a plurality of amino hydrogen atoms, while at least one inorganic corrosion-resistant chromate pigment also is included in at least one of the two components. In the '153 patent, the primer formulations are disclosed for use as a primer for bonding a paint topcoat upon a metallic surface, usually aluminum, in the aircraft industry. The use of chromates in coatings currently may be subject to regulatory considerations.

A need exists for enhanced performance with respect to resin-based protective coatings and filler or pigment additives for such coatings, which permit such coatings to be manufactured at competitive costs yet without sacrificing or compromising the needed Theological, inhibitive and barrier properties, and without requiring heavy metal additives such as chromates.

SUMMARY OF THE INVENTION

The present invention relates to coating compositions and a pigment used therein, in which the coating composition comprises a curable or hardenable resin system into which the pigment is dispersed. The pigment includes a first pigment mixture that comprises clay particles as first and second particle groups that have been surface treated with epoxy-functionalized organosilane or amino-functionalized organosilane, and a second pigment mixture that comprises clay particles as third and fourth particle groups that have been surface treated with amino-functionalized organosilane or epoxy-functionalized organosilane. The second particle group has a median particle size that is at least twice as large as the median particle size of the first group, and a similar size relationship is provided in the third and fourth particle groups. In a further aspect, the first and second particle groups, as well as the third and fourth particle groups, differ in size by at least an order of magnitude relative to each other.

In another aspect, the pigment further includes microspheres surface treated with organosilane that have a median size that is at least an order of magnitude larger than the second particle group.

In one preferred aspect, the resin system comprises a curable resin side and a curing agent side. The first pigment mixture is dispersed in either the curable resin side or the curing agent side, while the second pigment mixture is dispersed in the other side of the resin system. In a particular embodiment of this arrangement, the resin system in the coatable composition is a two-part epoxy coating system including a curable epoxy and an amine curing agent.

In an alternative aspect, curable or hardenable resins other than epoxies, such as polyurethanes, alkyds, and so forth, can be used as the resin system in the practice of this invention with or without curing agents as applicable.

It has been discovered that the combined use of clays having the different organosilane surface treatment chemistries, in conjunction with the different sizes, as set forth herein, yields an economical coating composition having improved performance. The coating compositions of this invention provide advantages such as lower cost, lower viscosity at higher volume solids and lower volatile organic content without compromising chemical resistance or barrier properties.

Among other things, it surprisingly has been observed that resin-based coating systems containing pigment according to this invention have significantly reduced viscosities as compared to comparative coating compositions formulated similarly but differing by using only one of the groups of clay particles. In one aspect of the invention, this rheological phenomenon is exploited such that high build protective coating compositions are provided having significantly higher pigment content than otherwise possible using only one of the groups of clay particles as pigment. This generally reduces material costs because more costly resin is effectively displaced in the coating composition formulation by the comparatively less costly pigment materials used according to this invention.

The ability to increase the proportion of pigment in the coating compositions in the practice of this invention is considered attributable at least in part to the particle packing benefits derived from the unique clay mixture used as a pigment. Namely, in one aspect of the invention, a pigment for use in the coating compositions is a dry, flowable clay mixture or blend including organosilane treated fine and coarse particle clays differing in median particle size sufficient to to yield particle packing benefits. In one aspect, the coarse clays generally are at least twice as large as, and, more particularly, at least an order of magnitude larger than, the fine clays in median particle size.

In one preferred aspect, the fine particle clays used in the clay mixture have platelet shapes. High pigment content high solids coating compositions, such as greater than 46% (56% of the dry coating film) by volume and 50% (58% of the dry coating film) by weight, have been successfully implemented using the clay mixtures including such platelet shaped particles as the group of fine particles used in the clay mixture, such as illustrated in the examples included herein. This is considered an advance because there has been conventional thinking that nodular or isometric shaped pigment particles were needed or important to achieve optimal particle packing benefits in coating compositions. In addition, the present invention also does not require use of microsphere fillers, although they are optional extenders, to achieve the desired Theological effects, although there may be benefits to their use in certain coating applications and the present invention also embraces embodiments in which they are included.

In one aspect, kaolin clay is a preferred type of siliceous clay for use in the practice of the invention. Kaolin clay does not cause significant increases in compositional viscosity, and other clays, which may be used are less preferred.

The coating compositions are ready-to-use formulations that can be applied and distributed over a portion of a surface or substrate to be coated by any convenient method and means. The coating compositions of the present invention can be readily formulated in flowable liquid form. These coatings can be applied to a surface by spraying, brushing, dipping, or any other suitable technique. Applications of the coating compositions include metal corrosion protection (e.g., marine, pipelines), waterproofing (e.g., fabrics, concrete), mechanical protection (e.g., optical surfaces, indoor flooring), and electrical insulation (e.g., wires). In one preferred aspect, the coating compositions are useful as protective coatings, such as surface coatings and linings applied to tanks, pipes, and the like. The present invention also encompasses such methods of application of the coating compositions described herein.

In another aspect, the invention also relates to clay mixtures comprised of either one or the combination of the above-mentioned first and second pigment mixtures.

DETAILED DESCRIPTION OF THE PREFERRED EMBODIMENTS

Figure 1:
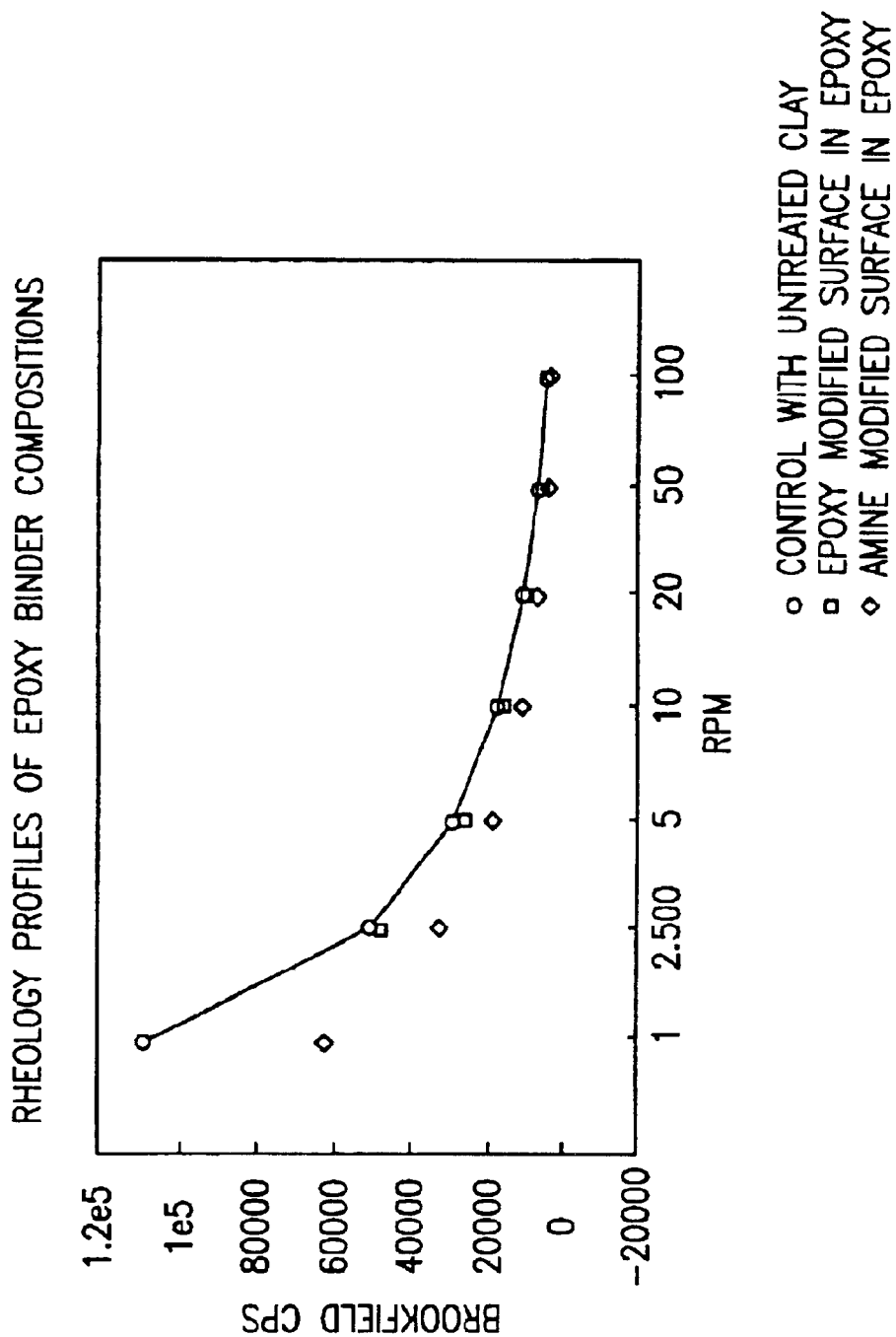
FIG. 1 is a graph representing rheology profiles of a two-part epoxy binder composition comprising epoxy and amine curing agent components containing amino- and epoxy-silane modified clay in the epoxy in comparison to a control epoxy binder containing unmodified clay in the epoxy.

The present invention relates to a coating composition and a pigment comprising surface-treated clay mixtures advantageously used therein in dispersed form. In one embodiment, the pigment comprises first and second clay mixtures respectively of epoxy-functionalized and amino-functionalized silane-treated clays, in which the clays of each mixture are comprised of fine and coarse particle sizes that differ in respective median particle size effective to enhance pigment particle packing effects. In another embodiment, the present invention also relates to a pigment mixture that includes the unique clay mixture in combination with microspheres surface treated with organosilane.

As will become apparent from the following discussions and examples, the clay mixture imparts enhanced particle packing benefits to the coating composition. Particle packing generally refers to a phenomenon in which finer particles nest inside interstitial gaps created between adjacent coarser particles to provide a more tightly packed particle structure within a common medium. In the coating compositions of this invention, the resin or binder component requirements of the coating compositions can be effectively replaced and reduced by use of the clay mixture described herein as pigment, while the barrier performance of the coating is maintained or even improved for a given film thickness.

Also, due to the high integrity, low void coatings prepared by this invention, enhanced surface protection is achievable while the number of application coats needed to provide a desired level of surface protection or sealing can be reduced. This also yields cost savings. The coating systems also are attractive from environmental and regulatory standpoints as they contain more solid material and less VOC content due to the ability to effectively increase the proportion of the clay filler and reduce resin and solvent content as well as enable the formulation of 100% solids coatings without losing barrier performance. The invention also provides flexibility to coating formulators to formulate high solids and/or high PVC coatings that would otherwise not be feasible. These advantageous effects and benefits of the invention also are achievable in uses of the clay mixture in combination with microspheres, as described herein.

For purposes herein, the terminology "order of magnitude" as used herein has its common meaning, i.e., a size or magnitude expressed as a power of ten. The terms "coarse" and "fine", as used herein to define particles, indicate a particle size difference between those two classes of particles that is at least an order of magnitude. The term "filler", as used herein, means a finely divided insoluble solid particulate which increases the stiffness and reduces the cost of the resin-containing medium into which it is dispersed. The term "pigment", as used herein, means a finely divided solid that is basically insoluble in the resin and imparts color and/or other essential properties to the coating composition. The siliceous clays described herein for use are both filler and pigment. The term "protective" refers to a physical barrier that inhibits direct contact being made between the outer surface of the substrate and liquids, vapors and/or solids present in the surrounding environment. For example, the protection provided by the coating can be corrosion-inhibition, and so forth. Unless indicated otherwise, "median particle size" values described herein are measured by the Malvern laser light scattering particle size method and a calibrated instrument for making such a measurement.

Various features of the coating systems and pigments of the invention will now be described in greater detail below.

Clay Material for Filler and Pigment

Pigment material is used to prepare a clay mixture yielding enhanced particle packing attributes in coating compositions. The pigment material is derived from finely divided siliceous clay, such as kaolin, talc, or hydrous silica. Kaolin clay is hydrated aluminum silicate, while talc is hydrated magnesium silicate.

In one preferred aspect, the siliceous clay is a kaolin clay, such as kaolinite, dickite, nacrite, halloysite, and zeolite. Smectite clays, such as montmorillonite, are less preferred as they tend to cause significant increases in viscosity. The principles of the invention are also thought to be generally applicable to other finely divided solid inorganic pigments, such as silicas, metal silicates, metal oxides, metal carbonates, carbon black, and so forth.

All of the above clays are available on a commercial scale. Bare (i.e., non-silane treated) kaolin clay is commercially available, for example, from J. M. Huber Corporation, for example, as product lines Polygloss® 90, Polyfil® 8039, and Huber® 35, and others.

Polygloss® 90 is a waterwashed fine particle, hydrous kaolin with a hexagonal platelet morphology that is provided in a dry milled form, and having a median particle size of 0.4–0.6 microns (μm) as measured by Malvern Laser Light Scattering Particle Size Method, a Hegman value of 7+, specific gravity of 2.6, pigment bulking value of 21.7 lb./gal., and a maximum retained screen residue on 325 Mesh (44 micron) of 0.010%.

Polyfil® 8039 is a waterwashed hydrous kaolin having a median particle size of 10.0 microns as measured by Malvern Laser Light Scattering Particle Size Method, and a maximum retained screen residue on 325 Mesh of 0.5%.

Huber® 35 is a waterwashed kaolin having a median particle size of 7.0 microns as measured by Malvern Laser Light Scattering Particle Size Method, a specific gravity of 2.60, a pigment bulking value 28lb./ft$^3$, and a maximum retained screen residue on 325 Mesh of 0.05%.

Huber® 35 and Polyfil® 8039 both are coarse cretaceous origin clays derived from centrifuge underflow streams in the waterwash process. Both the fine Polygloss® 90 particles and the coarse Huber® 35 and Polyfil® 8039 particle kaolin clays are platelet-like in shape, although the platelets are much thicker for the coarse clays. The coarse Huber® 35 and Polyfil® 8039 clays also contain some blocky particles that are "books" or stacks of platelets. Huber® 35 and Polyfil®8039 have higher aspect ratios than the Polygloss® 90.

Other kaolin clays also can be used to the extent they can be used in a manner satisfying the particle size and/or geometry requirements described herein.

Preparation of Silane-Treated Clays

The siliceous clay is surface treated with a functionalized organosilane, such as a functionalized alkoxysilane, in which the pendant functional group is a reactive organic moiety. As generally known, the alkoxy groups on the alkoxysilane are thought to hydrolyze to Si—OH groups, which subsequently react or otherwise associate with the hydroxyl (—OH) groups of the siliceous clay while leaving the reactive organic groups of the silane available to react with a curable resin.

For purposes herein, a "functionalized" organosilane refers to silicon-containing compounds which include, within a single molecule, one or more hydrolytic alkoxy groups which generate silanol groups which can form covalent bonds with the surface hydroxyls of kaolin clay by means of condensation, and a functional organic moiety which can form bonds with surrounding organic matrices. The above-mentioned hydrolytic group, for example, can be an ethoxy or methoxy group.

In one aspect, functionalized organosilanes are used having pendant epoxy or amino reactive groups, such as 3-glycidyloxypropyl-trimethoxysilane and 3-aminopropyltriethoxysilane, although other suitable epoxy or amino functional silanes are available. Amino-(or glycidyl-) trialkoxysilanes and dialkoxysilanes are commercially available that can be used to pretreat the clays.

In one aspect, the organosilane used in treating of the clays is represented by the following formula:

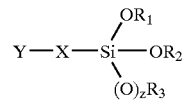

where $R_1$, $R_2$, $R_3$ each independently is selected from hydrogen, lower alkyl, aryl, lower alkylaryl, or lower arylalkyl, z is 0 or 1, Y is selected from the group consisting of a substituted or nonsubstituted glycidyl group, or a substituted or nonsubstituted amino group, and X is a non-substituted or substituted hydrocarbenyl linking group. "Lower alkyl" means a C1 to C6 alkyl group. In a more particular embodiment, z is 0, and $R_3$ is lower alkyl or aryl (but not hydrogen).

In another embodiment, organosilanes having non-reactive chemistries relative to curable resins, such as a polyalkylalkoxysilane, also can be used to pretreat the clays. Nonfunctionalized organosilanes in this regard include dialkoxy and trialkoxyorganosilanes defined by the following structural formula:

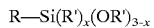

$$R-Si(R')_x(OR')_{3-x}$$

where R is $C_1$–$C_{10}$ alkyl, alicyclic, aryl, vinyl, or methacryl; R' is methyl or ethyl; and x is an integer value of 0 or 1. Examples of such nonfunctionalized organosilanes include isobutyltrimethoxysilane, vinyltrimethoxysilane, n-octyltrimethoxysilane, methyltrimethoxysilane, and n-propyltrimethoxysilane, and so forth.

The organosilane is added onto the surface of the siliceous clay in an amount effective to provide the above functions, and that amount generally ranges from about 0.1% to about 5%, based on dry weight of the clay. When treating a kaolin clay with the organosilane, the treatment level generally is 0.3% to 1.0% by weight. The treatment level is also dependent on the BET surface area of the pigment. That is, a clay having a larger BET will in general require a larger addition rate of organosilane than a comparable clay having a smaller BET value, all other things equal. As a practical matter, the clays are treated with the silanes before introduction into a coating composition as filler.

In the instance of surface modifying the clay with amino organosilanes, such as aminoalkylpolyalkoxysilanes, the modified kaolin pigments can be prepared by blending the dry clay with the amino silane provided in solution (e.g., a minor amount of silane in water or in an organic solvent), in a suitably sized mixer, and then is dried in an oven. The dried surface modified product typically also will be post-milled and screened for sake of uniformity. These procedures can be done in a combined manner in a multi-purpose grinding/classification mill as described herein. A suitable mill for this purpose is Mikro-Samplmill™ manufactured by Pulverizing Machinery Co. in Summit, N.J., U.S.A. This mill advantageously can be used as fitted with a 0.020 micron screen for product classification. The clay fed into the mill is processed until it all passes through the screen. The silane treated clay can be passed through the mill one or more times to achieve the desired level of uniformity and fineness as measured by its Hegman Grind value.

In the instance of surface modifying the clay with epoxy organosilanes, such as glycidylalkylpolyalkoxy-silanes, the modified kaolin pigments can be prepared by blending the clay with the epoxy silane, as introduced neat, in a suitably sized mixer, and then air drying the mixture in bags overnight. This dried surface modified product typically is post-milled and sized, such as using a mill as described above.

In the case of clays surface treated with non-reactive chemistries, such as alkylpolyalkoxysilanes, a general preparation method akin to that described above for surface treating clays with epoxy silanes again can be used, and reference is made thereto.

Other suitable techniques for bringing the organo silanes into generally uniform contact with the surfaces of the clay to permit the surface modification to occur, and/or drying the wetted clays, also can be employed. For example, the slurried clays can be treated and subsequently dried by spray drying methods, such as described in U.S. Reissue Pat. No. RE30,450, which teachings are incorporated herein by reference. Alternatively, the amino organo silanes can be contacted upon the surfaces of the clay via the use of emulsions, such as described in U.S. Pat. No. 6,197,105, which teachings are incorporated herein by reference.

Silane-modified kaolin clays are also commercially available, which can be used as the siliceous clay. Examples of such include Nulok® 390, which is an aminosilane treated kaolin available from J. M. Huber, Kennesaw, Ga., U.S.A.

Clay Mixture Composition

In one aspect, two different clay mixtures are included in a coating composition of the invention. Each of these two clay mixtures will include a blend of fine and coarse particles as described herein, but will differ in the particular organosilane treatment employed in each respective clay mixture. The fine and coarse clay particles are premixed into an essentially uniform dry flowable blend of finely divided particles before introduction of the resulting particulate mixture into a coating resin. In one embodiment, the fine and coarse particle groups used in each clay mixture are separately pretreated with epoxy-functionalized silane or an amino-functionalized silane as described elsewhere herein, before their combination to form a clay mixture, although that is not necessarily required. Alternatively, a physical mixture of fine and coarse clay particles could be prepared first, followed by a common single silane-treatment on the resulting mixture. However, the fine and coarse clays used in a common clay mixture should have been surface treated with the same type of organosilane, i.e., epoxy-functionalized or amino-functionalized silane. The coating compositions of the present invention then can be prepared including therein a first clay mixture including epoxy-functionalized silane treated fine and coarse clays and a second clay mixture including amino-functionalized silane treated fine and coarse clays.

In another embodiment, the fine and coarse clays of a clay mixture are surface treated with non-functionalized organosilane, such as an alkylalkoxysilane.

Also, depending on the needs of the application, non-silane treated clays also can be used as supplemental filler or extender in the coating composition. The clays used in as clay mixture are intrinsically solid, non-hollow particles.

The fine and coarse clay particles can be physically mixed and blended to form the clay mixture by any suitable mixing means for that purpose.

In one aspect, for a clay mixture, the fine group of particles comprises about 10 to about 80% by volume, more specifically about 13 to about 25% by volume, of the clay mixture and have a median particle size in the range of approximately 0.1 to approximately 1.0 microns, more specifically approximately 0.25 to approximately 0.75 microns, while the coarse group of particles comprises 90 to 20% by volume, and more specifically about 87 to about 75% by volume, of the clay mixture, and have a median particle size in the range of approximately 4.0 to approximately 40 microns, and more specifically approximately 5 to approximately 15 microns. These volume percentages of the fine and coarse particles are also generally applicable relative to the combined total amounts of such fine and coarse particles of both clay mixtures in the coating composition as a whole.

The fine and coarse groups of clay particles, in combined weight, generally comprise 12% to 75% of total volume of the total pigment, filler and extenders used in the coating composition.

In one preferred aspect, at least the fine particles have a platelet geometrical shape, such as hexagonal platelet. The choice of the platelet shaped particles as the fine particle group of the clay mixtures, as compared to other geometries, such as spherical or nodular, is observed to increase the barrier performance of the coatings. Although not desiring to be bound to any theory at this time, the fine clay platelet geometries are believed to chemically bond into the resin or binder matrix to provide a more effective barrier to corrosive elements.

Pigment Mixture

In another embodiment of the invention, a pigment mixture is provided as a combination of the clay mixture described herein and microspheres. The microspheres, which are also sometimes referred to as microbubbles, used in this manner can be hollow or cellular microspheres, such as glass microspheres, ceramic microspheres, polymeric microspheres, such as, for example, Q-Cel, Extendorspheres, Expancel, or comparable commercially obtainable microsphere products. In one embodiment, the microspheres have organosilane surface treatments, which can be commercially obtained or can be prepared by surface treating untreated microspheres that are obtained. The silane surface treatments used on the microspheres include, for example, epoxy and amino silane chemistries, such as those described herein for use in connection with the clay mixture. In another embodiment, the microspheres lack a surface treatment.

Generally, the microspheres used in the pigment mixture have a median particle size that is at least an order of magnitude larger than the larger particle groups used in the clay mixture. The dry thickness of the coating film generally will be larger when the microspheres are included in sufficient amounts to effect the coating build. In one embodiment, the microspheres have a median particle size of approximately 100 to approximately 300 microns. The total volume of the pigment mixture, i.e., the clay mixture and microspheres, used in the coating composition generally is up to about 50% (wet film) and up to about 80% (dry film) of the total pigment volume of the coating film in which it is used. In one embodiment, the blend of the microspheres and clay mixture in the pigment mixture contains approximately 20 to 95% by volume microspheres and approximately 5 to 80% by volume clay mixture. Pigment particles can pack efficiently using these combinations and choices of pigment clays and microspheres.

The clay mixtures and pigment mixtures described herein can be used in a wide variety of resinous coatings, such as used for paints, primers, varnishes, inks, and so forth.

Resin Material

The resin or binder used to form the primary organic medium or continuous phase into which the additives including the clay mixture is to be dispersed can be a thermosetting or thermoplastic resin. It should be a curable or hardenable resin effective to immobilize the pigment in place within the dried or cured coating film. The resin system can be a one part resin system containing the clay mixtures described herein or a multi-part resin system containing different types of silane treated clay mixtures in different parts of the resin system.

The resin can be selected, for example, from among epoxy polymers, polyurethanes, alkyds, melamine polymers, phenolic polymers, ureaformaldehyde polymers, unsaturated polyesters, polyethylenes, polypropylenes, polystyrenes, saturated polyesters, polyamides, polyvinyl compounds, polyisoprenes, polybutadienes, polystyrenebutadienes, individually or in combinations thereof, and the like.

The resinous polyepoxides, which may be used in this invention, include diglycidyl ethers of bisphenol A, diglycidyl ethers of bisphenol F, the glycidyl ethers of glycerol, epoxylated novolacs, resorcinal diglycidyl ethers, and the like. These are usually provided by the reaction of epichlorohydrin with a polyhydric organic compound which is normally a polyhydroxy phenol, e.g., bisphenol A, bisphenol F, trihydroxy diphenyl dimethyl methane, 4,4'-dihydroxy biphenyl and the like. Other polyhydric organic compounds are also useful, e.g., ethylene glycol, 2,3-butane diol, erythritol, glycerol, and the like. The above noted resinous polyepoxides, also known as epoxy resins, can be cured by reaction of the epoxide groups therein with amines which contain a plurality of amino hydrogen atoms as provided in a separate component of the coating composition, as will be discussed hereinafter.

Bisphenol A and F based epoxy resins and epoxy phenol novolacs having molecular weights ranging from 350 to 6000 are included. Suitable commercially available epoxides include, for instance, EPON 1001, EPON 1009, and the like, which can be obtained from Resolution.

In one aspect of the invention, the coating composition has a resin system provided as a two-component formulation in which a curable resin comprising an epoxy resin is included in one component, while an epoxy curing agent having a plurality of amino hydrogen atoms is included in a separate second component. The clay mixture, and other various additives, can be included in either or both parts. In addition, in a preferred aspect, different types of functionalized clay mixtures can be included as between the epoxy component and the amine component of the two-component formulation. For instance, amino-functionalized clay mixtures can be used in the epoxy component, while epoxy-functionalized clay mixtures can be used in the amine component. Alternatively, amino-functionalized clays can be used in the amine component, while epoxy-functionalized clays can be used in the epoxy component. In either strategy, viscosity reductions can be achieved when the pigments are proportioned for optimal packing fractions as described herein.

The curing reaction between a polyepoxide and an amine containing a plurality of amino hydrogen atoms is itself generally well known, and numerous amines are available for this purpose. Since cure at room temperature is preferred, aliphatic amines containing the primary amine group are preferred. Such amines are illustrated by aliphatic polyamines, modified aliphatic polyamines, amidopolyamines, cycloaliphatic polyamines, polyamides, and aromatic amines, individually or in combinations thereof. Specific examples include, for instance, a combination of amidopolyamine and modified aliphatic amine curing agents. Where exceptional adhesion to an aluminum, galvanized steel or stainless steel substrate or base is an important consideration, polyalkoxysubstituted silane-based primary amines are particularly preferred since they improve adhesion to an aluminum or zinc substrate or base. These are illustrated by N-beta-(aminoethyl)-gamma-aminopropyl trimethoxysilane.

The epoxy-amine curing reaction also can be accelerated by including a catalyst such as, but not limited to, tertiary amine, e.g., tris(dimethylaminomethyl)-phenol, which is included in the amine component of the coating composition. It can reduce the film set time by as much as approximately one-half, depending on the circumstances.

The base resin that is modified by the clay mixture described herein may also be a polyurethane polymer composition formed from a variety of long chain polymers containing urethane linkage groups. For example, a relatively short chain polymer, either a polyester or a polyether, is reacted with an organic diisocyanate to form a long chain urethane polymer. As understood in the art, depending on the specific reactants and process variations, a thermosetting, thermoplastic or liquid casting polyurethane polymer can be provided. Commercial sources of these classes of polyurethanes are widely available. In the case of polyurethane resins, a polyurethane resin can be included in a first component of the coating composition, and an isocyanate crosslinking agent can be included in a second component. Alkyd resins and other crosslinkable resins also can be used.

Optional Coating Additives

The coating formulations can optionally include one or more other additives including those commonly used in protective coating compositions, such as extenders, rheology modifiers, volatile organic solvents, prime pigments, reactive diluents, additives for flow control, ultraviolet light absorbers, free radical eliminators, moisture eliminators, reaction catalysts, and so forth. Illustrations of these additives are provided herein.

The prime pigments can be used to obtain a wide range of color, such as by including titanium dioxide, or an inhibitive pigment combination, such as metal phosphates and borates, can be provided to further enhance corrosion resistance. Appropriate solvents include, but are not limited to, for example, toluene, xylene, and methyl ethyl ketone, or any of the well known ether solvents, such as methoxypropanol. Even isopropanol can be used since it is inert under the room temperature conditions contemplated, though it would be reactive at elevated temperature if the system were appropriately catalyzed. The proportions of these additional agents, such as pigments and solvents, are not critical within reasonable limitations and will be apparent to those skilled in the art.

Preparation of the Coating Compositions

The ingredients of the coating formulations are combined with mixing until they are essentially uniformly blended together. Conventional mixing means used for blending coating compositions can be used for that purpose and any suitable sequence of admixture of the ingredients can be used.

The total amount of a clay mixture or clay mixtures in a coating composition generally comprises at least 13% and can be as much as 50% by volume of the coating composition. If a two-part resin system is used, such as a an epoxy resin and amine curing agent, the total amount of clay mixture in each side of the resin system generally can range from about 5% to 50% by volume. In one preferred aspect of this invention, the clay mixture comprised of the first and second groups of clay particles can be added to the coating composition in a proportional amount effective that they constitute up to 75% by volume of the dried film, and up to 80% of the total weight of the dried film. This high filler content is made possible by the particle packing benefits imparted by the clay mixture as devised and the surface modification defined above. The high filler content also serves to significantly reduce the VOC content of the composition by effectively replacing and reducing the resin and solvent requirements.

To the extent the requirements described herein for the coating composition of the invention are otherwise met, introduction of other types of pigment or filler extender materials is optional.

In one aspect, the PVC/CPVC addition ratio can be provided in excess of 0.75, and even approach 1.0. The clay mixture filler used according to this invention can be used as the dominant volume component in the coating. The term "CPVC" refers to the critical pigment volume content at which point a sharp decline in mechanical and protective properties occurs at the given content level of pigment particles. The term CPVC is a term of art defined, for example, in U.S. Pat. No. 4,171,228, which teachings are incorporated herein by reference.

As the chemically surface treated clays used in the practice of this invention can be provided at significantly lower cost, e.g., as much as approximately half the cost or more, of the resin materials used in the coating composition, coating formulations can be provided in a more economical manner. The ability to use higher pigment content in the coating compositions while reducing the resin content also makes the composition more environmentally friendly as VOC content is lowered and the clay pigment is relatively chemically inert in the environment in which the coatings can be expected to be used. In some circumstances, high solids, high pigment volume content (PVC) coatings have been made with the rheology and application properties normally expected of coatings with half the solids and PVC.

Coating Formulations

Several illustrative, non-limiting generalized coating formulations representing this invention are set forth below.

Coating Formulation I:

| EPOXY COATING WITH MICROSPHERES | |
|---|---|
| Material | Weight Percent |
| Component 1: | |
| epoxy resin (1) | 22.02 |
| reactive diluent (2) | 2.20 |
| rheology modifier (3) | 0.36 |
| titanium dioxide | 12.15 |
| coarse particle surface treated kaolin (4) | 5.01 |
| fine particle surface treated kaolin (5) | 2.28 |
| solvent (6) | 5.74 |
| surface treated hollow microspheres (7) | 8.59 |
| Component 2: | |
| cross linking agent (8) | 12.11 |
| rheology modifier (3) | 0.25 |
| coarse particle surface treated kaolin (4) | 6.81 |
| fine particle surface treated kaolin (5) | 0.85 |
| solvent (6) | 10.88 |
| surface treated hollow microspheres (7) | 10.75 |

(1) polyepoxide resins based on diglycidyl ether of bisphenol A, epoxy phenol, novolac resins, halogenated polyepoxide resins, cycloaliphatic polyepoxide resins, and solutions thereof.
(2) monoglycidyl ether compounds such as, but no limited to, alkyl glycidyl ethers, cresyl glycidyl ether, Cardura E-10 or equivalent.
(3) fumed silicas such as, but not limited to, Cab-O-Sil M-5, treated clays such as Bentone 38, polyamide waxes such as Crayvallac Extra, attapulgite clays such as Attagel 50, mixed mineral thixotropes such as Garamite 1958, or equivalents.
(4) kaolin clay substrates with median particle diameters of 7–10 microns, such as, but not limited to, Huber ® 35 and Polyfil ® 8039 made by J. M. Huber Corp. with organosilane surface treatments.
(5) kaolin clay substrates with median particle diameters less than 1 micron, such as Polygloss 90 made by J. M. Huber Corporation, with surface treatments as described herein.
(6) aliphatic hydrocarbons, aromatic hydrocarbons, ketones, esters, glycol ethers, glycol ether esters, terpenes, nitroparaffins, and the like.
(7) hollow microspheres such as glass (silica) microspheres, ceramic microspheres, polymeric microspheres, such as, for example, Q-Cel, Extendorspheres, Expancel, or comparable commercial microsphere products, with or without organosilane surface treatments.
(8) Modified and unmodified aliphatic polyamines, modified and unmodified cycloaliphatic polyamines, amidoamines and polyamides.

Coating Formulation II:

EPOXY COATING WITHOUT MICROSPHERES

| Material | Weight Percent |
|---|---|
| Component 1: | |
| epoxy resin (1) | 18.04 |
| reactive diluent (2) | 1.83 |
| rheology modifier (3) | 0.24 |
| titanium dioxide | 8.05 |
| coarse particle surface treated kaolin (4) | 19.12 |
| fine particle surface treated kaolin (5) | 2.40 |
| solvent (6) | 3.44 |
| Component 2: | |
| cross linking agent (8) | 10.13 |
| rheology modifier (3) | 0.16 |
| coarse particle surface treated kaolin (4) | 26.12 |
| fine particle surface treated kaolin (5) | 3.27 |
| solvent (6) | 6.84 |

Coating Formulation III:

SEMIGLOSS POLYURETHANE COATING WITH MICROSPERES

| Material | Weight Percent |
|---|---|
| Component 1: | |
| polymeric polyol (9) | 25.52 |
| rheology modifiers (10) | 2.62 |
| titanium dioxide | 28.80 |
| coarse particle surface treated kaolin (4) | 4.08 |
| fine particle surface treated kaolin (5) | 0.79 |
| solvent (6) | 17.82 |
| surface treated hollow microspheres (7) | 0.75 |
| other additives (11) | 4.75 |
| Component 2: | |
| polyisocyanurate (12) | 9.62 |
| solvent (6) | 5.25 |

(9) acrylic, polyester or polyether polyols designated as urethane grade.
(10) fumed silicas such as, but not limited to, Cab-O-Sil M-5, treated clays such as Bentone 38, polyamide waxes such as Crayvallac Extra, attapulgite clays such as Attagel 50, mixed mineral thixotropes such as Garamite 1958, cellulose acetate butyrate thickeners, or equivalents.
(11) additives for flow control, ultraviolet light absorption, free radical elimination, moisture elimination and reaction catalysis, and the like.
(12) aliphatic polyisocyanates and solutions of aliphatic polyisocyanates such as, but not limited to, hecamethylene diisocyanate and isophorone diisocyanate, aromatic isocyanates and solutions of aromatic polyisocynates such as, but not limited to, toluene diisocyanate.

Coating Formulation IV:

ALKYD PRIMER WITH MICROSPERES

| Material | Weight Percent |
|---|---|
| alkyd resin (13) | 21.64 |
| rheology modifier (3) | 2.25 |
| red iron oxide | 13.67 |

-continued

ALKYD PRIMER WITH MICROSPERES

| Material | Weight Percent |
|---|---|
| corrosion inhibitive pigments (14) | 16.45 |
| coarse particle surface treated kaolin (4) | 7.53 |
| fine particle surface treated kaolin (5) | 0.93 |
| solvent (6) | 32.08 |
| hollow microspheres (7) | 1.73 |
| other additives (15) | 3.72 |

(13) long oil alkyd resins, medium oil alkyd resins, short oil alkyd resins, chain stopped alkyd resins, copolymer alkyd resins, modified alkyd resins.
(14) zinc phosphate, multiphase phosphate pigments, zinc molybdate, calcium molybdate, zinc phosomolybdate, zinc calcium phosphomolybdate, zinc borophosphate, barium metaborate, individually or in combinations, and the like.
(15) grinding aids, antiskin agents, dryers, and so forth.

The prepared coatings can be readily formulated in flowable liquid form for immediate use, or stored in suitable containers for shipping, handling, and storage until used for a coating application.

Application of the Coating Formulations

The coatings can be applied to a substrate surface in any suitable manner, such as by spraying, brushing, blade application, or dipping, and so forth.

For instance, in the case of coating metal surfaces, the metallic surfaces can be prepared by cleaning the same such as by sandblasting or with an acid etch. The roughened and/or cleaned surface is then coated with the coating composition, and it is cured by ambient air drying or the drying process is accelerated by application of heat, such as by placing the coated part in a heated oven.

The application of the high build coatings of this invention can be performed effectively such that the coating composition forms a dry film having an average film thickness of about 0.003 to about 0.125 inch (about 0.76 to about 3.2 millimeters), or more specifically about 0.010 to about 0.100 inch (about 0.25 to about 2.5 millimeters). These above indicated film thickness ranges apply where silica microspheres are not included in the coating composition. In coating compositions of the invention that include silica or other types of microspheres, the dry film has an average film thickness of about 0.200 to about 0.550 inch (about 5.0 to about 14.0 millimeters), more specifically about 0.22 to about 0.39 inch (about 5.5 to about 10.0 millimeters).

The coating can be provided in multi-coat form, while permitting a reduction in the number of coats needed for many applications to provide adequate barrier performance, which saves cost, while maintaining performance properties at fewer coats.

Applications of the coatings include, for example, metal corrosion protection (e.g., marine, pipelines), waterproofing (e.g., fabrics, concrete), mechanical protection (e.g., optical surfaces, indoor flooring), and electrical insulation (e.g., wires). In one preferred aspect, the coating compositions are useful as paints or protective coatings, such as surface coatings and linings applied to tanks, pipes, structural steel, concrete, and the like that may be subject to corrosion due to corrosive substances present in the immediate environment. The term "protective", as used herein, refers to a physical barrier that inhibits direct contact from being made between the outer surface of the substrate and liquids, vapors and/or solids present in the surrounding environment. For example, the protection provided by the coating can be corrosion-inhibition, and so forth.

EXAMPLES

The following examples are presented to illustrate the invention, but the invention is not to be considered as limited thereto. In the following examples, parts are by weight unless indicated otherwise.

Example 1

A series of epoxy coating compositions were prepared containing various combinations of epoxy-functional silane-treated kaolin clay and amino-functional silane-treated kaolin clay of different nominal particle sizes, as well as a control formulation containing untreated kaolin clay of a given nominal particle size. A study was performed in which coating viscosities were measured for the various coating formulations to assess and compare the affect of the various surface modified pigments on the rheology of the coatings.

Epoxy-functionalized surface-treated kaolin clays (platey aluminum silicate) having different median particle sizes were prepared as follows.

(A) 0.6 Micron Kaolin with Epoxy Functionality 600 g of Polygloss® 90 was treated with 0.75% 3-glycidoxypropyltrimethoxysilane (4.6 g) neat. The clay and silane were mixed on a lab Henschel mixer at 30% for 20 minutes, stopping at 10 minutes to scrape the sides. 8 runs were done in this manner and blended together. The treated clay was dried overnight. The dried treated clay was milled using a Mikro-Samplmill™ fitted with a 0.020 micron screen (one pass through). The resulting surface treated clay had a Hegeman value of 7+.

(B) 10.0 Micron Kaolin with Epoxy Functionality 600 g of Polyfil® 8039 was treated with 0.40% 3-glycidoxypropyltrimethoxysilane (9.2 g) neat. The clay and silane were mixed on a lab Henschel mixer at 30% for 20 minutes, stopping at 10 minutes to scrape the sides. 2 runs were done in this manner and blended together. The treated clay was dried overnight. The dried treated clay was milled using a Mikro-Samplmill™ fitted with a 0.020 micron screen (one pass through). The resulting surface treated clay had a Hegeman value of 5.

(C) 0.6 Micron Kaolin with Amino Functionality 4762.8 g of Polygloss® 90 was treated with 0.75% 3-aminopropyltrimethoxysilane (10% aqueous solution, 357.21 g). The clay and silane were mixed on a pilot Hobart mixer for 20 minutes on 3. The sample was dried in an oven at 65 degrees Celsius for about 5 hours. Moisture content was 0.71%. The dried, treated clay was milled using a Mikro-Samplmill™ fitted with a 0.020 micron screen (four separate passes through). The resulting surface treated clay had a Hegeman value of 4.5.

(D) 10.0 Micron Kaolin with Amino Functionality 4762.8 g of Polyfil® 8039 was treated with 0.40% 3-aminopropyltrimethoxysilane (10% solution, 190.50 g). The clay and silane were mixed on a pilot Hobart mixer for 20 minutes on 2. The sample was dried in a pan overnight and then in an oven at 65 degrees Celsius for about 3 hours. The dried treated clay was milled using a Mikro-Samplmill™ fitted with a 0.020 micron screen (one pass through). The resulting surface treated clay had a Hegeman value of 5.

The pigmentation used in formulations, which includes the above-described chemically surface-treated platey aluminum silicates, comprised the following:

| Pigment Identifier | Ingredients |
|---|---|
| CON-EAAE | a) amino-functional and epoxy-functional surface treated silica microspheres (mean particle size = 100 microns). The amine treated pigment was used in the epoxy component and the epoxy treated pigment was used in the amine component of the coating formulation; b) untreated fine clay particles (platey aluminum silicate) having a median particle size of 0.4 microns obtained as Engelhard ASP-200. This is a Stokes equivalent particle diameter by Sedigraph measurement rather than a Malvern LLS type particle size. |
| EEAA | a) amino-functional and epoxy-functional surface treated silica microspheres (mean particle size = 100 microns); b) amino-functional and epoxy-functional surface treated platey aluminum silicate having a median particle size of 10 microns; c) amino-functional and epoxy-functional surface treated platey aluminum silicate having a median particle size of 0.6 micron. The epoxy-functional pigments were used in the epoxy component and the amino-functional pigments were used in the amine component of the coating formulation. |
| EAAE | Same as EEAA except that the amino-functional pigments were used in the epoxy component and the epoxy-functional pigments were used in the amine component of the coating formulation. |

Treated versions of these clays were produced for testing wherein one treated clay was introduced into one side of a formulation (e.g., the epoxy resin portion) and the other treated clay was introduced into the other side of the formulation (e.g., the amine curing agent portion).

To accomplish this, each of the above pigments was introduced into an epoxy formulation that was otherwise the same except for the difference in pigmentation.

The epoxy formulations representing the present invention, which included one of either pigment EEAA or EAAE, each had the basic formulation described below. The amounts of epoxy-functional surface-treated clay and amino-functional surface-treated clay used was approximately the same for the coating formulations representing the present invention.

Representative Coating Formulation:

| EPOXY COATING WITH TREATED CLAY MIXTURE AND MICROSPHERES | |
|---|---|
| Material | Weight Percent |
| Component 1: | |
| epoxy resins (1) | 24.22 |
| rheology modifier (2) | 0.36 |
| titanium dioxide | 12.15 |
| Coarse Surface Treated Clay | 5.01 |
| Fine Surface Treated Clay | 2.28 |
| Solvent (3) | 5.74 |
| microspheres (4) | 8.59 |

-continued

EPOXY COATING WITH TREATED CLAY
MIXTURE AND MICROSPHERES

| Material | Weight Percent |
|---|---|
| Component 2: | |
| cross linking agent (5) | 12.11 |
| rheology modifier (6) | 0.25 |
| Coarse Surface Treated Clay | 5.01 |
| Fine Surface Treated Clay | 2.28 |
| Solvent (3) | 5.74 |
| microspheres (4) | 10.75 |

(1) Diglycidyl ether of bisphenyl A, and derivatives thereof
(2) Y25-X, polyethylene was in xylol, SUD Chemie
(3) Toluene
(4) Ceramic microspheres
(5) polyamine resins
(6) Crayvallac Ultra, polyamide wax, Cray Valley Ltd.
(7) Burgess #10, kaolin pigment The control coating composition used a similar epoxy formulation except that it omitted the treated coarse clay and included untreated fine clay. The control formulation was as follows.

Control Coating Formulation:

EPOXY COATING WITH UNTREATED
CLAY AND MICROSPHERES

| Material | Weight Percent |
|---|---|
| Component 1: | |
| epoxy resin (1) | 24.22 |
| rheology modifier (2) | 0.36 |
| titanium dioxide | 12.15 |
| Fine Untreated Clay (7) | 5.05 |
| Solvent (3) | 5.74 |
| microspheres (4) | 8.59 |
| Component 2: | |
| cross linking agent (5) | 12.11 |
| rheology modifier (6) | 0.25 |
| Fine Untreated Clay (7) | 6.82 |
| Solvent (3) | 5.74 |
| microspheres (4) | 10.75 |

For each test coating formulation, including the control formulation, the recipe was prepared such that the total pigment volume concentration was 56% and the nonvolatile content by volume was 80%.

Viscosity measurements were taken with a Brookfield RV viscometer (spindle #4 or #6 as required in order to obtain at least 4 raw readings between 10 and 100 rpms) for each coating formulation at a series of different rpms. The resulting Brookfield rheology profiles are presented graphically in FIGS. 1–3. The "A" suffix represents the epoxy binder component only. The "B" suffix represents the amine binder component only. The "A_B" suffix represents the components combined ready for application.

Figure 2:
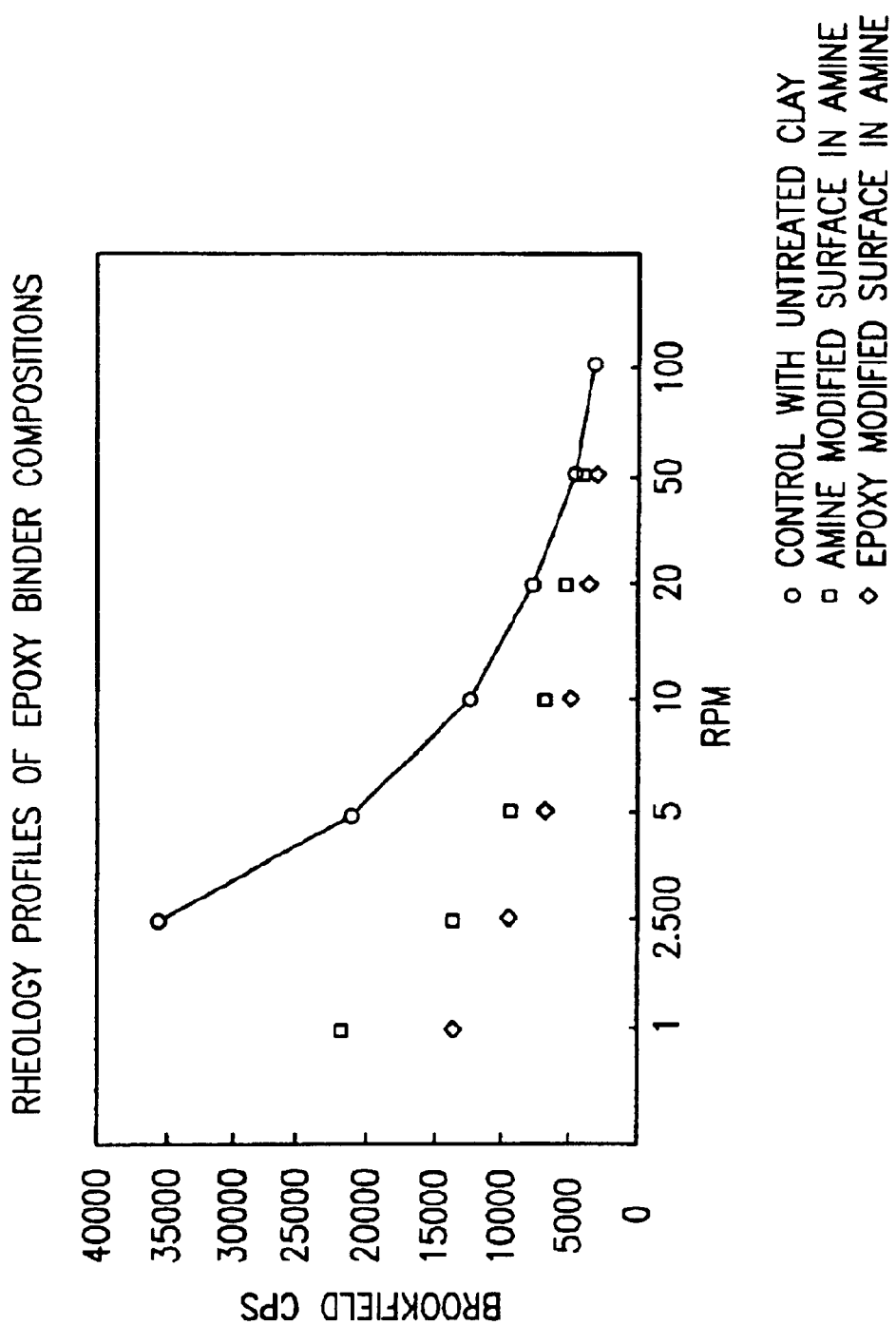
FIG. 2 is a graph representing rheology profiles of a two-part epoxy binder composition comprising epoxy and amine curing agent components containing amino- and epoxy-silane modified clay in the amine curing agent in comparison to a control epoxy binder containing unmodified clay in the amine curing agent.
Figure 3:
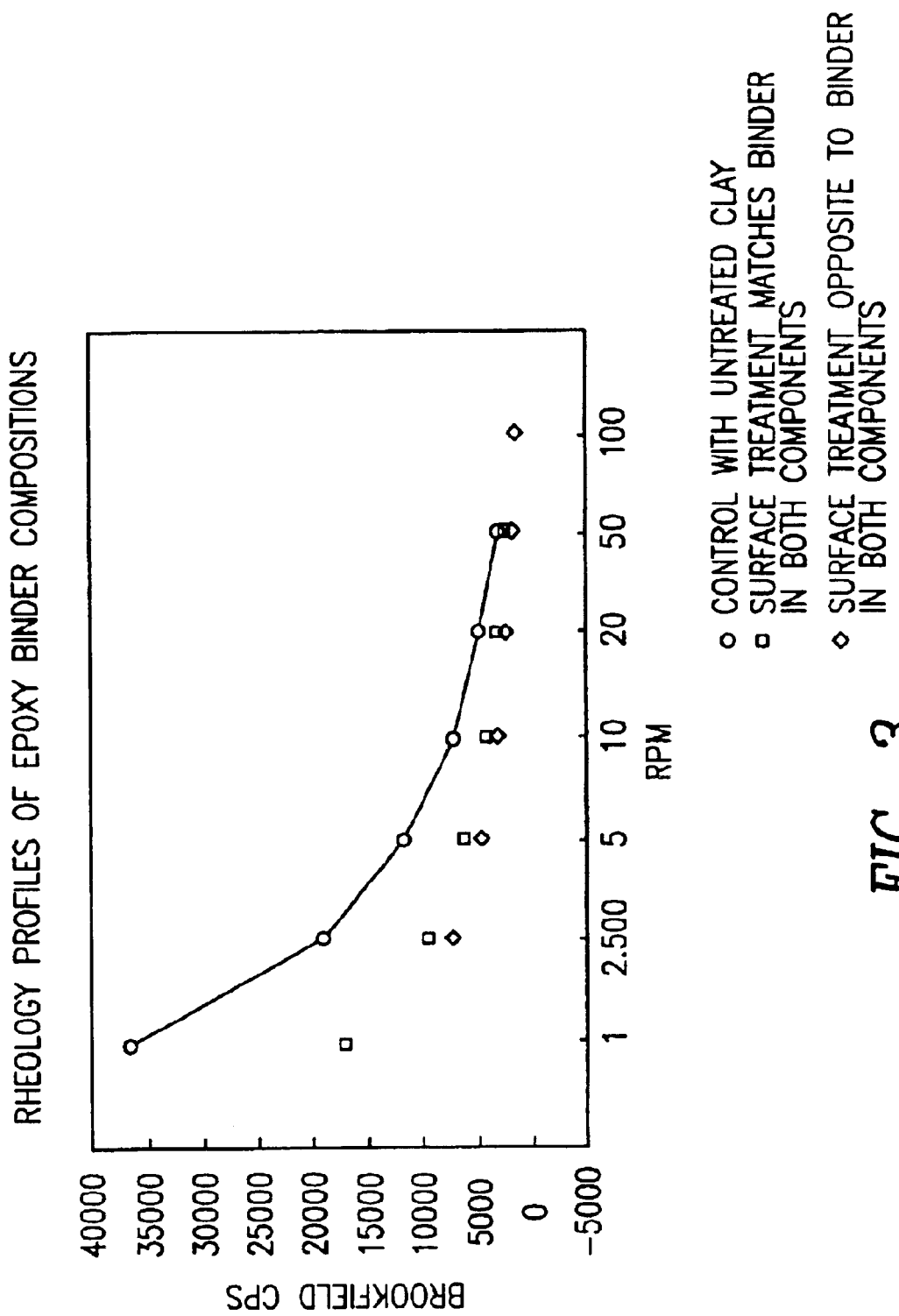
FIG. 3 is a graph representing rheology profiles of a two-part epoxy binder composition comprising epoxy and amine curing agent components containing amino- and epoxy-silane modified clay in the epoxy and amine curing agent in comparison to a control epoxy binder containing unmodified clay in the epoxy and amine curing agent.

As can be seen in the results plotted in FIGS. 1–3, significant reductions in the individual component viscosities and in the combined system viscosity were achieved when the pigment combination of fine and coarse particle treated clays are used to provide improved compatibility and particle packing benefits. In particular, the control formulation designated as "CON-EAAA", which instead used a combination of fine particle untreated clay and treated microspheres, displayed significantly higher viscosities than the representative formulations of the present invention.

The ability to reduce the viscosity of these high build epoxy coating systems using a combination of functionalized fine and coarse treated clays indicates that the PVC content can be increased further, thereby lowering formulation cost through the replacement of expensive resin, while still maintaining or possibly improving barrier performance properties of the coating.

In addition, the coating formulations prepared according to this example also were observed to be sprayable film-forming compositions. All of the coating types were applied by spray to sand blasted steel panels, and the resulting coating films were observed to set uniformly without delamination.

Example 2

Measurements were taken to compare the physical properties of coatings prepared from formulations representative of each of the present invention (Formulation EAAE above) versus those of U.S. Pat. No. 4,075,153 (duplication of "Example") as a comparison coating formulation. The results are set forth in Table 1.

TABLE 1

| Property | Formulation (EAAE) | Comparison Formulation |
|---|---|---|
| solids by wt. (%) | 85 | 39 |
| solids by vol. %) | 80 | 22 |
| VOC | 1.34 | 5.37 |
| PVC | 57 | 36 |
| density (lb./gal.) | 8.89 | 8.72 |
| applied dry film thickness (mm) | 10–100 | 0.11–0.70 |
| surface treated PVC | 56 | 24 |
| surface treated clay PVC | 6.3 | 24 |

The advantages of the Formulation EAAE over the comparison formulation are readily apparent from the results reported in Table 1 in terms of the significant increases in filler content, PVC, and sustainable film thickness build obtained with the coating formulation of the present invention while concurrently reducing VOC levels.

A summary follows of testing performed on steel panels coated with experimental coating compositions containing treated clays according to above Formulation EAAE. The test panels were sand blasted per SSPC SP-5 white metal blast. The treated clay-containing coatings were applied by spray yielding 11 to 13 dry mils in a single coat. Comparisons are made to a commercial three coat polyamide-epoxy system applied by spray to yield 11 to 13 mils dry film and with compositions that are identical in all respects except that they contain no treated clay pigments.

TABLE 2

DISTILLED WATER IMMERSION @ 72 DEGREES F.

| | |
|---|---|
| Duration: | 1 Year |
| Outcome: | No effect with treated or untreated pigments. |

TABLE 3

ELECTROCHEMICAL IMPEDANCE SPECTROSCOPY PER AMCOTECH STD. SP-05-96-RO

| | |
|---|---|
| Duration: | 30 Days |
| Outcome for Impedance: | |
| Treated and Untreated Clays | |
| Day 1: | $10^9$ to $10^{10}$ |
| Day 30: | $>10^8$ |
| Three Coat Polyamide Epoxy System | |
| Day 1: | $10^8$ |
| Day 30: | $<10^8$ |

TABLE 4

SALT SPRAY PER ASTM B 117

| | |
|---|---|
| Duration: | 2,700 Hours |
| Outcome: | Treated and Untreated Clays = Maximum ⅛ Inch Scribe Undercut |
| Scribe Rust: | No Other Effects |

TABLE 5

MECHANICAL PROPERTIES

Pull-Off Strength of Coatings Per ASTM D 4541:

| | |
|---|---|
| Treated and Untreated Clays: | 250 psi |

Resistance to Rapid Deformation Per ASTM D 2794:

| | |
|---|---|
| Treated and Untreated Clays: | 100 inch pounds. |

Example 3

Additional experimental studies were conducted to investigate the effect of the treated clays on coating performance in thin coatings that did not include silica microspheres or beads. Through these studies, it was demonstrated that the combination of coarse and fine particle size clays that were treated with various silanes according to an embodiment of the invention produced two-part epoxy coatings with higher solids and superior barrier properties, without the inclusion of silica microspheres.

The experiment was carried out in a series of two-part epoxy formulations as described in Table I. Table II indicates the silane treatment and level applied to the clays used in this experiment. All the coatings were produced on standard lab manufacturing equipment. The coatings were made to the highest solids possible by adding the minimum amount of solvent needed to be able to produce the coatings. The same amount of solvent was added to the Part A and B coating components for each coating as to keep the 1:1 volume ratio intact. After 24 hours equal volume portions of A & B components were mixed and allowed to age for 30 minutes.

In the following Table I, the following abbreviations and terms used therein have the following meanings:

"UT" means "untreated"; "NR" means "Non-Reactive silane treated"; "EF" and "Epoxy" each means "Epoxy-Functional silane treated"; "AF" and "Amino" each means "Amino-Functional silane treated"; "MRD" means "Mono-functional Reactive Diluent"; "$TiO_2$" means "Huntsman $TiO_2$ TR93"; "Curing Agent" means "Ancamine AD Curing Agent"; "IPA" means "isopropyl alcohol"; and "MIBK" means "methyl isobutyl alcohol". Blank spaces in Table I mean that no data entry applies thereto.

TABLE I

Formulation Chart for 2-Part Epoxy with Treated Clays

| | 45 PVC | | | | 50 PVC | | | | 55 PVC | | | |
|---|---|---|---|---|---|---|---|---|---|---|---|---|
| Description | UT | NR | Amino | Epoxy | UT | NR | Amino | Epoxy | UT | NR | Amino | Epoxy |
| A Component | | | | | | | | | | | | |
| Epon 828 | 192 | 237 | 195 | 201 | 159 | 216 | 174 | 174 | 140 | 194 | 143 | 140 |
| MRD | 19.07 | 23.62 | 19.41 | 20.02 | 15.82 | 21.49 | 17.32 | 17.32 | 13.91 | 19.33 | 14.21 | 13.9 |
| TiO2 | 83.84 | 104 | 85.33 | 88.01 | 69.55 | 94.48 | 76.15 | 76.14 | 61.15 | 84.96 | 62.47 | 61.11 |
| EF Polygloss 90 | | | | 33.05 | | | | 35.54 | | | | 35.37 |
| AF Polygloss 90 | | | 32.05 | | | | 35.55 | | | | 36.16 | |
| NR Polygloss 90 | | 39 | | | | 44.11 | | | | 49.18 | | |
| NR Huber 35 | | 279 | | | | 315 | | | | 351 | 258 | |
| EF Huber 35 | | | | 236 | | | | 254 | | | | 252 |
| AF Huber 35 | | | 229 | | | | 254 | | | | | |
| Huber 35 | 225 | | | | 232 | | | | 253 | | | |
| Polygloss 90 | 31.49 | | | | 32.47 | | | | 35.4 | | | |
| MIBK | 89.09 | 30.44 | 84.46 | 76.65 | 115.12 | 36.51 | 93.91 | 93.94 | 124.09 | 42.52 | 119.45 | 124.12 |
| B Component | | | | | | | | | | | | |
| Ancamide 2426 | 94.96 | 118 | 96.65 | 99.68 | 78.77 | 107 | 86.25 | 86.24 | 69.24 | 96.2 | 70.74 | 69.2 |
| Curing Agent | 10.66 | 13.2 | 10.85 | 11.19 | 8.84 | 12.01 | 9.68 | 9.68 | 7.77 | 10.8 | 7.94 | 7.77 |
| AF Polygloss 90 | | | 33.04 | | | | 36.65 | | | | 37.28 | |
| EF Polygloss 90 | | | | 34.07 | | | | 36.64 | | | | 36.46 |
| NR Polygloss 90 | | 40.2 | | | | 45.47 | | | | 50.7 | | |
| NR Huber 35 | | 355 | | | | 401 | | | | 448 | | |
| EF Huber 35 | | | | 301 | | | | 323 | | | | 322 |
| AF Huber 35 | | | 291 | | | | 323 | | | | 329 | |
| Huber 35 | 286 | | | | 295 | | | | 322 | | | |
| Polygloss 90 | 32.46 | | | | 33.47 | | | | 36.49 | | | |

TABLE II

Treated Clays Used in 2-Part Epoxy Study

| Clay Substrate | Treatment and Level |
| --- | --- |
| Polygloss 90 | 0.75% IBTEO |
| Polygloss 90 | 0.75% AMEO |
| Polygloss 90 | 0.75% GLYMO |
| Huber 35 | 0.4% IBTEO |
| Huber 35 | 0.4% AMEO |
| Huber 35 | 0.4% GLYMO |

All of the treated clays showed improvements in viscosity over the untreated clays at all three PVC levels. It is interesting to note that the clays with non-reactive treatments consistently gave coatings with lower viscosity's at higher viscometer revolutions per minute (RPM's). The amino and epoxy treated clays were very similar in their viscosity's across the RPM ranges. All of the coatings showed shear-thinning behavior, but the coatings containing clay pigments with non-reactive treatments always had the lowest high shear viscosity. It should be noted that the 55 PVC coating with untreated clay pigments was too thick to be measured by the Brookfield viscometer at the higher RPM values.

Each coating was then applied to standard untreated/uncoated Steel 3"×6" Q panels with a 15 mil box blade. The panels were allowed to dry at laboratory ambient conditions overnight, and then put in an oven at 120° F. overnight to achieve full cure. The panels were then tested using an acid spot test and salt spray. The acid spot test was carried out with 10% (by weight) Hydrochloric Acid Solution. A drop of the acid solution was added to the coatings, and for 24 hours additional acid was added as needed to keep the film wet. The panels were monitored for the appearance of $FeCl_3$ staining at the coating surface. For salt spray, the back and edges of the panels were taped and placed in the salt spray cabinet maintained in accordance with ASTM B-117.

The acid spot test showed that after 24 hours all of the 45 PVC coatings had no staining. Of the 50 PVC coatings only the untreated clay coating showed any staining, and it was only very slight. It only took 4 hours for the untreated clay 55 PVC coating to show staining and complete loss of adhesion under the acid contact area. After 24 hours, the coatings containing epoxy functional and amino functional clays at 55 PVC both showed very slight staining but no loss of adhesion. Only the non-reactive treated clay 55 PVC coating showed no staining or loss of adhesion after 24 hours.

As for the salt spray after 89 hours of exposure the untreated clay at 55 PVC failed with rust through, and at 137 hours the untreated clay at 50 PVC also failed with rust through. At 260 hours the epoxy treated clays at 55 PVC failed with rust through. The testing was ended at 336 hours exposure in order to have panels that effectively illustrate the performance differences between compositions containing treated clays and compositions containing untreated clays. Most of the panels coated with compositions containing treated clays at pigment volume concentrations up to 55% would have withstood additional exposure without exhibiting signs of decay.

As shown by the combined results of the acid spot test and salt spray test, the critical pigment volume concentration (CPVC), which, for purposes of this study, is defined as the PVC where early rust bleed through occurs can be increased to over 55 PVC in 2K epoxy systems by employing clays with the non-reactive and amino treatments. The epoxy treatment improved coating performance over that of the untreated clays, but exhibited early rust bleed through at between 50 and 55 PVC. The untreated clays exhibited early rust bleed through between 45 and 50 PVC.

A viscosity study was carried out using a #21 spindle on a Brookfield RVT viscometer fitted with a small sample adapter. Again equal volume portions of the A and B components were mixed, and at this time the solids for each PVC were adjusted to the same level with additional solvent. The paints were aged in a water bath at 25° C. for 30 minutes prior to viscosity measurement. To ensure consistency, each paint was measured with the same technique.

At 0.5 RPM, 1 RPM, and 2.5 RPM the Brookfield was allowed to rotate one time before a reading was taken. At 5 RPM it was allowed to rotate two times; at 10 and 20 RPM five times; 50 RPM ten times; and at 100 RPM 15 times. The readings were taken sequentially from 0.5–100 RPM and then back down from 100–0.5 RPM. The viscosity units are Brookfield centipoises.

The viscosity studies are summarized in Table III.

TABLE III

Viscosity For 2-Part Epoxy Coatings with Treated Clays

| | 45 PVC | | | | 50 PVC | | | | 55 PVC | | | |
| --- | --- | --- | --- | --- | --- | --- | --- | --- | --- | --- | --- | --- |
| | Un-treated | Non-Reactive | Amino Functional | Epoxy Functional | Un-treated | Non-Reactive | Amino Functional | Epoxy Functional | Un-treated | Non-Reactive | Amino Functional | Epoxy Functional |
| 0.5 RPM | 24500 | 14700 | 14400 | 13000 | 20000 | 11200 | 11500 | 14000 | 22200 | 17000 | 15500 | 17000 |
| 1 RPM | 13750 | 8250 | 8500 | 7350 | 15350 | 7000 | 6600 | 8000 | 18500 | 10250 | 10000 | 12500 |
| 2.5 RPM | 5900 | 3800 | 4000 | 3600 | 6640 | 3180 | 3240 | 3600 | 13700 | 4740 | 4900 | 6300 |
| 5 RPM | 3250 | 2100 | 2300 | 2000 | 4070 | 1720 | 1800 | 1950 | 9070 | 2620 | 2800 | 3520 |
| 10 RPM | 1825 | 1225 | 1385 | 1185 | 2200 | 975 | 1035 | 1110 | Off Scale | 1450 | 1625 | 1975 |
| 20 RPM | 1075 | 737.5 | 875 | 750 | 1225 | 567.5 | 625 | 667.5 | Off Scale | 837.5 | 1000 | 1155 |
| 50 RPM | 595 | 407 | 522 | 457 | 592 | 295 | 349 | 370 | Off Scale | 422 | 562 | 615 |
| 100 RPM | 415 | 280 | 385 | 330 | 372.5 | 192.5 | 238.5 | 251 | Off Scale | 267 | 390 | 410 |
| 50 RPM | 575 | 395 | 502 | 425 | 580 | 287 | 330 | 350 | Off Scale | 414 | 542 | 597 |
| 20 RPM | 1012.5 | 692.5 | 812.5 | 687.5 | 1150 | 542.5 | 575 | 612.5 | Off Scale | 800 | 962.5 | 1092.5 |
| 10 RPM | 1700 | 1150 | 1275 | 1075 | 2050 | 935 | 950 | 1020 | 4750 | 1400 | 1525 | 1850 |
| 5 RPM | 2950 | 1970 | 2100 | 1750 | 3750 | 1650 | 1520 | 1750 | 8600 | 2500 | 2570 | 3220 |
| 2.5 RPM | 5400 | 3500 | 3600 | 3000 | 7000 | 2940 | 2800 | 3100 | 14400 | 4500 | 4440 | 5740 |
| 1 RPM | 12250 | 7750 | 7750 | 6600 | 15250 | 6750 | 6100 | 7000 | 19000 | 10000 | 9100 | 12000 |
| 0.5 RPM | 23200 | 14500 | 14000 | 12500 | 18200 | 12500 | 11200 | 13000 | 23000 | 16700 | 15000 | 17000 |

These viscosity studies demonstrate that all of the coatings containing treated clays representing the present invention show lower viscosities compared to the untreated clays. With respect to coatings, lower viscosities may be associated with improved application and general handling characteristics. The non-reactive treatment always gives the lowest high shear viscosity, while the epoxy and amine treatments provide similar results to each other.

It will be understood that various changes in the details, materials, and arrangements of the parts which have been described and illustrated herein in order to explain the nature of this invention may be made by those skilled in the art without departing from the principles and scope of the invention as expressed in the following claims.

What is claimed is:

1. A clay mixture, comprising:
   a finely divided siliceous clay which has been surface treated with organosilane, and wherein the clay comprises a mixture of a first group of clay particles having a respective first median particle size and a second group of clay particles having a respective second median particle size that is at least an order of magnitude larger than the first median particle size, wherein the first and second clay particle groups have been surface treated by a system independently selected from the group consisting of epoxy-functionalized organosilane, amino-functionalized organosilane, and non-reactive organosilane; wherein the first group of particles comprises 10 to 80% by volume of the clay mixture and has a median particle size in the range of approximately 0.1 to approximately 1.0 microns, and the second group of particles comprises 90 to 20% by volume of the clay mixture and has a median particle size in the range of approximately 4.0 to approximately 40 microns.

2. The clay mixture according to claim 1, wherein the first group and the second group of clay particles comprise platelet shapes.

3. The clay mixture according to claim 1, wherein the siliceous clay comprises kaolin.

4. The clay mixture according to claim 1, wherein the organosilane is represented by the following formula:

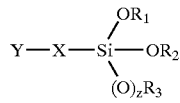

where R1, R2, and R3 each independently is selected from hydrogen, lower alkyl, aryl, lower alkylaryl, or lower arylalkyl, z is 0 or 1, Y is selected from the group consisting of a substituted or nonsubstituted glycidyl group, or a substituted or nonsubstituted amino group, and X is a non-substituted or substituted hydrocarbenyl linking group.

5. The clay mixture according to claim 1, wherein the organosilane is added onto the surface of the siliceous clay in an amount of about 0.1% to about 5%, based on dry weight of the clay.

6. The clay mixture according to claim 1, wherein the first and second clay particle groups have been surface treated by epoxy-functionalized organosilane.

7. The clay mixture according to claim 1, wherein the first and second clay particle groups have been surface treated by amino-functionalized organosilane.

8. The clay mixture according to claim 1, wherein the first and second clay particle groups have been surface treated by non-reactive organosilane defined by the following structural formula:

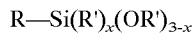

where R is $C_1$–$C_{10}$ alkyl, alicyclic, aryl, vinyl, or methacryl; R' is methyl or ethyl; and x is an integer value of 0 or 1.

9. A pigment mixture, comprising:
   a finely divided siliceous clay which has been surface treated with organosilane, and wherein the clay comprises a mixture of a first group of clay particles having a respective first median particle size and a second group of clay particles having a respective second median particle size that is at least an order of magnitude larger than the first median particle size, wherein the first and second clay particle groups have been surface treated by a system independently selected from the group consisting of epoxy-functionalized organosilane, amino-functionalized organosilane, and non-reactive organosilane; and
   microspheres surface treated with organosilane, the microspheres having a median particle size that is at least an order of magnitude larger than that of the second particle group.

10. The pigment mixture according to claim 9, wherein the microspheres have a median particle size of approximately 100 to 300 microns.

11. The pigment mixture according to claim 9, wherein the organosilane is represented by the following formula:

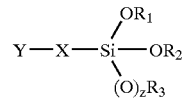

where $R_1$, R2, and R3 each independently is selected from hydrogen, lower alkyl, aryl, lower alkylaryl, or lower arylalkyl, z is 0 or 1, Y is selected from the group consisting of a substituted or nonsubstituted glycidyl group, or a substituted or nonsubstituted amino group, and X is a non-substituted or substituted hydrocarbenyl linking group.

12. The pigment mixture according to claim 9, wherein the organosilane is added onto the surface of the siliceous clay in an amount of about 0.1% to about 5%, based on dry weight of the clay.

13. The pigment mixture according to claim 9, wherein the first and second clay particle groups have been surface treated by epoxy-functionalized organosilane.

14. The pigment mixture according to claim 9, wherein the first and second clay particle groups have been surface treated by amino-functionalized organosilane.

15. The pigment mixture according to claim 9, wherein the first and second clay particle groups have been surface treated by non-reactive organosilane defined by the following structural formula:

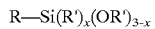

where R is C1–C10 alkyl, alicyclic, aryl, vinyl, or methacryl; R' is methyl or ethyl; and x is an integer value of 0 or 1.

16. A coating composition, comprising:
(a) a hardenable resin system, and
(b) a pigment including
(i) clay particles surface treated with organosilane that are dispersed in the resin system, comprising
a first pigment mixture dispersed in the resin system that includes first and second particle groups that have been surface treated with epoxy-functionalized organosilane or amino-functionalized organosilane, wherein the second particle group has a median particle size that is at least twice as large as the median particle size of the first particle groups, and
a second pigment mixture dispersed in the resin system that includes third and fourth clay particle groups that have been surface treated with amino-functionalized organosilane or epoxy-functionalized organosilane, and the fourth particle group has a median particle size that is at least twice as large as the median particle size of the third particle group,
wherein the second particle group has a median particle size that is at least an order of magnitude larger than the median particle size of the first particle group, and the fourth particle group has a median particle size that is at least an order of magnitude larger than the median particle size of the third particle group; and, optionally,
(ii) microspheres surface treated with organosilane, the microspheres having a median particle size that is at least an order of magnitude larger than that of each of the second and fourth particle groups.

17. The coating composition according to claim 16, wherein the resin system includes a curable resin selected from the group consisting of epoxy polymers, polyurethanes, alkyds, melamine polymers, phenolic polymers, ureqformaldehyde polymers, unsaturated polyesters, polyethylenes, polypropylenes, polystyrenes, saturated polyesters, polyamides, polyvinyl compounds, polyisoprenes, polybutadienes, polystyrene-butadienes, individually or in combinations thereof.

18. A coating composition, comprising:
(a) a curable or hardenable resin system comprising a mixture of first and second components, wherein the first component comprises a curable resin, and the second component comprises a curing agent for the curable resin, and
(b) a pigment including
(i) clay particles surface treated with organosilane that are dispersed in the resin system, comprising
a first pigment mixture dispersed in one of the first and second resin system components that includes first and second clay particle groups that have been surface treated with epoxy-functionalized organosilane or amino-functionalized organosilane, and the second particle group has a median particle size that is at least twice as large as the median particle size of the first particle group, and
a second pigment mixture dispersed in the other of the first and second resin system components that includes third and fourth clay particle groups that have been surface treated with amino-functionalized organosilane or epoxy-functionalized organosilane, and the fourth particle group has a median particle size that is at least twice as large as the median particle size of the third particle group,
wherein the groups of clay particles in combination comprise up to 75% of total volume of the pigment present within the resin system, and, optionally,
(ii) microspheres surface treated with organosilane, the microspheres having a median particle size that is at least an order of magnitude larger than that of each of the second and fourth particle groups.

19. The coating composition according to claim 18, wherein the second particle group has a median particle size that is at least an order of magnitude larger than the median particle size of the first particle group, and the fourth particle group has a median particle size that is at least an order of magnitude larger than the median particle size of the third particle group.

20. The coating composition according to claim 18, wherein the first and third groups of particles comprise 10 to 80% by volume of the clay mixture and each has a median particle size in the range of approximately 0.1 to approximately 1.0 microns, and the second and fourth groups of particles comprise 90 to 20% by volume of the clay mixture and each has a median particle size in the range of approximately 4.0 to approximately 40 microns.

21. The coating composition according to claim 18, wherein the clay particle groups comprise siliceous clay that comprises up to 50% by volume of the coating composition dry film.

22. The coating composition according to claim 18, wherein the pigment comprises up to 75% by volume of the coating composition.

23. The coating composition according to claim 18, wherein the clay particle groups comprise kaolin.

24. The coating composition according to claim 18, wherein the organosilane is represented by the following formula:

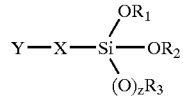

where R1, R2, and R3 each independently is selected from hydrogen, lower alkyl, aryl, lower alkylaryl, or lower arylalkyl, z is 0 or 1, Y is selected from the group consisting of a substituted or nonsubstituted glycidyl group, or a substituted or nonsubstituted amino group, and X is a non-substituted or substituted hydrocarbenyl linking group.

25. The coating composition according to claim 18, wherein the organosilane is added onto the surface of the clay particles in a total amount of about 0.1% to about 5%, based on dry weight of the clay.

26. The coating composition according to claim 18, wherein the curable resin comprises an epoxy resin and the curing agent comprises an epoxy curing agent having a plurality of amino hydrogen atoms.

27. The coating composition according to claim 26, wherein the first pigment mixture is included in the epoxy resin, and the second mixture is included in the epoxy curing agent.

28. The coating composition according to claim 26, wherein the first pigment mixture is included in the epoxy curing agent, and the second pigment mixture is included in the epoxy resin.

29. The coating composition according to claim 18, having a pigment volume concentration (PVC)/critical pigment volume concentration (CPVC) ratio value of 0.75 to 1.0.

30. A method of providing a barrier coating on a solid surface comprising:

applying a coating composition on the surface in film form, wherein the coating composition comprises a curable or hardenable resin system comprising a mixture of first and second components, wherein the first component comprises a curable resin, and the second component comprises a curing agent for the curable resin, and a dispersion in the resin system of a pigment including clay particles surface treated with organosilane, and, optionally, microspheres surface treated with organosilane, wherein the pigment being selected to comprise:

a first pigment mixture dispersed in one of the first and second resin system components that includes first and second clay particle groups that have been surface treated with epoxy-functionalized organosilane or amino-functionalized organosilane, and the second particle group has a median particle size that is at least twice as large as the median particle size of the first particle group, and a second pigment mixture dispersed in the other of the first and second resin system components that includes third and fourth clay particle groups that have been surface treated with amino-functionalized organosilane or epoxy-functionalized organosilane, and the fourth particle group has a median particle size that is at least twice as large as the median particle size of the third particle group; and drying or permitting drying of the film to form a dried film from the applied coating composition, which film is attached to the solid surface.

31. The method of claim 30, wherein the applying is performed effective that the coating composition forms a dry film having an average film thickness of about 0.003 to about 0.125 inch.

32. The method of claim 30, wherein the contacting of the surface with coating composition is repeated at least once.

33. The method of claim 30, wherein the contacting of the surface with the coating composition comprises using an application technique selected from at least one of brushing, spraying, blade coating, or dipping.

34. A clay mixture, comprising:

A finely divided siliceous clay which has been surface treated with organosilane, and wherein the clay comprises a mixture of a first group of clay particles having a respective first median particle size and a second group of clay particles having a respective second median particle size that is at least an order of magnitude larger than the first median particle size, wherein the first and second clay particle groups independently have been surface treated by non-reactive organosilane defined by the following structural formula:

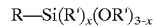

where R is isobutyl, R' is methyl or ethyl; and x is an integer value of 0.

35. A coating composition, comprising:

(a) a hardenable resin system, and (b) a pigment including
  (i) clay particles surface treated with organosilane that are dispersed in the resin system, comprising
    a first pigment mixture dispersed in the resin system that includes first and second particle groups that have been surface treated with an organosilane material selected from an epoxy-functionalized organosilane, an amino-functionalized organosilane, and a non-reactive organosilane, wherein the second particle group has a median particle size that is at least twice as large as the median particle size of the first particle group, and
    a second pigment mixture dispersed in the resin system that includes third and fourth clay particle groups that have been surface treated with an organosilane material selected from an epoxy-functionalized organosilane, an amino-functionalized organosilane, and a non-reactive organosilane, and the fourth particle group has a median particle size that is at least twice as large as the median particle size of the third particle group, wherein the second particle group has a median particle size that is at least an order of magnitude larger than the median particle size of the first particle group, and the fourth particle group has a median particle size that is at least an order of magnitude larger than the median particle size of the third particle group.

* * * * *